United States Patent [19]

Surnamer et al.

[11] Patent Number: 5,013,332
[45] Date of Patent: May 7, 1991

[54] MEMBRANES FORMED FROM RIGID POLYARYLATES

[75] Inventors: Andrew D. Surnamer, Allentown; Chao-Fong Tien, Macungie, both of Pa.

[73] Assignee: Air Products and Chemicals, Inc., Allentown, Pa.

[21] Appl. No.: 518,400

[22] Filed: May 3, 1990

[51] Int. Cl.$^5$ .................. B01D 53/22; B01D 71/30
[52] U.S. Cl. ........................................... 55/16; 55/68; 55/158
[58] Field of Search ..................... 55/16, 68, 158; 528/190, 191

[56] References Cited

U.S. PATENT DOCUMENTS

| Re. 30,351 | 7/1980 | Hahn et al. | 55/16 |
|---|---|---|---|
| 3,822,202 | 7/1974 | Hoehn | 55/16 |
| 3,899,309 | 8/1975 | Hoehn et al. | 55/16 |
| 4,378,400 | 3/1983 | Makina et al. | 428/220 |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,840,646 | 6/1989 | Anand et al. | 55/16 |
| 4,880,442 | 11/1989 | Hayes | 55/16 |
| 4,882,057 | 11/1989 | Morgan et al. | 56/16 X |
| 4,897,092 | 1/1990 | Burgoyne, Jr. et al. | 55/158 X |
| 4,929,405 | 5/1990 | Kohn | 55/16 X |
| 4,932,982 | 6/1990 | Hayes | 55/16 |
| 4,932,983 | 6/1990 | Hayes | 55/16 |
| 4,948,400 | 8/1990 | Yamada et al. | 55/16 X |

FOREIGN PATENT DOCUMENTS

| 0244126 | 11/1987 | European Pat. Off. |
| 63-190607 | 8/1988 | Japan |
| 63-278524 | 11/1988 | Japan |
| 1-194904 | 8/1989 | Japan |
| 01194905 | 8/1989 | Japan |

OTHER PUBLICATIONS

T. H. Kim et al., "Reverse Permselectivity of $N_2$ over $CH_4$ in Aromatic Polyimides," J. Appl. Poly. Sci. vol. 34 (1987).

M. Salme, "Prediction of Gas Barrier Properties of High Polymers", Poly. Eng. Sci., vol. 26, p. 1543, Dec. 1986.

Primary Examiner—Robert Spitzer
Attorney, Agent, or Firm—Mark L. Rodgers; William F. Marsh; James C. Simmons

[57] ABSTRACT

The present invention is a class of polymeric membranes formed from aromatic polyarylates derived from dicarboxylic acid chlorides and conformationally rigid cyclohexyl bisphenols having halo or methyl substituents on all positions ortho to the hydroxy functions. These polarylate membranes exhibit high gas permselectivities and are useful in various gas separation applications.

8 Claims, No Drawings

MEMBRANES FORMED FROM RIGID POLYARYLATES

TECHNICAL FIELD OF THE INVENTION

The present invention relates to polymeric membranes which are useful in gas separation operations.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

U.S. Pat. Nos. 3,822,202 and 3,899,309; Re 30,351 (1980), disclose a process for separating fluids using a semi-permeable membrane made from polyimides, polyesters or polyamides. The repeating units of the main polymer chain of these membranes are distinguished in that such repeating units have at least one rigid divalent subunit, the two main chain single bonds extending from which are not colinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 disclose polymeric membranes and processes using the membranes for separating components of a gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer.

U.S. Pat. No. 4,378,400 discloses gas separation membranes formed from aromatic polyimides based upon biphenyltetra-carboxylic dianhydride for separating various gas mixtures. Japanese Patent Application No. 1-194905 discloses gas separation membranes formed from various polyimides and Japanese Patent Applications Nos. 63-190607 and 63-278524 disclose gas separation membranes formed from various polyamides. Japanese Patent Application No. 1-194904 discloses gas separation membranes formed from polyarylates having hydrogen, methyl, or ethyl groups on all positions ortho to the hydroxy functions. Such membranes are reported to have $O_2/N_2$ selectivities from 1.7 to 2.5.

U.S. Pat. No. 4,840,646 and related E. P. Application No. 87303339.3 disclose tetrabromo bisphenol based polyestercarbonate membranes. The bisphenols contain linking groups selected from —C=O—, —$SO_2$—, and —O—.

M. Salame in Poly. Eng. Sci., 26 1543 (1986) developed a predictive relationship for oxygen permeability coefficient [$P(O_2)$] and polymer structure. In the publication he demonstrates the group contributions of structural portions of a polymer to $P(O_2)$ values. In particular he indicates the presence of an aromatic group; i.e. phenyl, in place of methylene decreases the $P(O_2)$ values for a pair of comparative polymers.

BRIEF SUMMARY OF THE INVENTION

The present invention is a class of improved polyarylate membranes and processes for using said membranes to separate one or more components of a gas mixture. The membranes of the present invention are formed from aromatic polyarylates derived from dicarboxylic acid chlorides and conformationally rigid cyclohexyl bisphenols having halo or methyl substituents on all positions ortho to the hydroxy functions. The subject membranes exhibit exceptionally high gas permselectivity and are useful in gas separation applications, especially for the separation of oxygen and nitrogen from air.

DETAILED DESCRIPTION OF THE INVENTION

The present invention is a class of polymeric membranes which exhibit high selectivity in gas separation applications, especially for the separation of oxygen from air. The membranes of the present invention are formed from aromatic polyarylates derived from aromatic dicarboxylic acid chlorides and conformationally rigid cyclohexyl bisphenols having halo or methyl substituents on all positions ortho to the hydroxy functions. The polyarylates from which these membranes are formed can be represented by the structural formula:

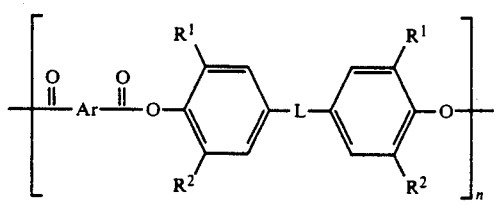

Wherein Ar is a $C_1$–$C_{20}$ divalent hydrocarbon, which may be halo substituted, with preferred embodiments being selected from:

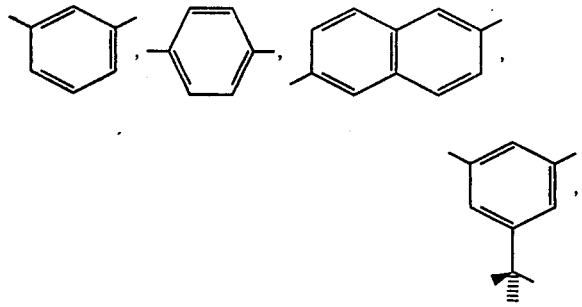

and/or a mixture of the above;

$R^1$ and $R^2$ are independently halo or methyl, n is an integer greater than 50, and L is a cyclohexyl moiety either substituted at the 4 position with a $C_4$–$C_{12}$ alkyl group or a $C_6$–$C_{20}$ aryl group, or diequitorally substituted at the 3, 5 positions with a $C_1$–$C_4$ alkyl group. In instances wherein L is a cyclohexyl moiety diequitorally substituted at the 3 and 5 positions, it can be represented by the structural formula:

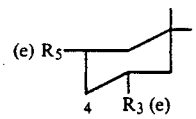

wherein each R is independently a $C_1$–$C_4$ alkyl group and the numbers representing positions on the ring.

In the above polymer structure, the presence of halo or methyl substituents on all four positions ortho to the hydroxy functionality along with the conformationally rigid cyclohexyl bisphenol moiety sterically restricts free rotation around the arylate linkage. It is believed that this rigid intra-molecular conformation may promote greater selectivities (α) for various gas separation applications such as O2 and N2 separation.

In addition to the above polyarylate structures, minor amounts of other monomer units may be present which do not affect the gas separation properties of the resultant membranes. The polyarylates of the present invention can be used to form membranes in any desired configuration known in the art, such as dense films, flat sheets, hollow fibers, and the like.

As stated above the polyarylate membranes of the present invention are useful in a variety of gas separation applications, especially for the recovery of oxygen from an $O_2/N_2$ stream or from air. The gas mixture to be separated is simply brought into contact with the membrane whereby one or more components selectively permeates through the membrane.

The following examples are presented to better illustrate the present invention and are not meant to be limiting.

EXAMPLE I

Thin film polyarylate membranes are made in accordance with the procedure set out below. These polyarylate membranes have the general structural formula:

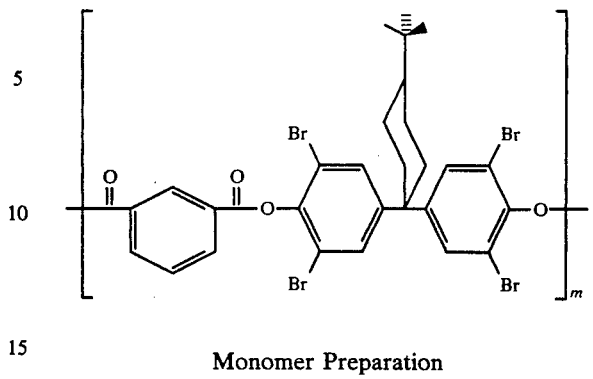

Monomer Preparation

A three neck, 500 ml round bottom flask, equipped with a mechanical stirrer, a reflux condenser with $N_2$ inlet, and an additional funnel, is charged with 36.87 grams (0.114 moles) of 1,1-bisphenol-4-t-butyl-cyclohexane, 300 ml of ethanol, and 100 ml of water. The stirring solution is cooled to 0° C. The additional funnel is charged with 25 ml (0.50 moles). The bromine is added slowly. When the addition is completed the solution is warmed to room temperature and allowed to stir for one hour. The solution is filtered and then collected and rinsed with water and then dissolved into chloroform and dried over magnesium sulfate. The solution is filtered and some of the chloroform is distilled off. The product slowly crystallizes out. The material is recrystallized three times.

Polymer Preparation

All glassware is heated in an oven at ≧120° C. for at least two hours. The glassware is then allowed to cool in a nitrogen atmosphere. Under a nitrogen atmosphere, a three neck 100 ml round bottom flask equipped with a mechanical stirrer and $N_2$ inlet is charged with 9.59 grams (0.015 moles) of 1,1-bis(2,6-dibromophenol)-4-t-butyl-cyclohexane and 40 ml of anhydrous dimethylacetamide. The solution is warmed to increase monomer solubility. When the monomer dissolves the solution is cooled to 0° C. 3.05 grams (0.015 moles) isophthaloyl dichloride is added to the stirring solution. Pyridine (8 ml) is also added. The solution's viscosity rapidly increases within the first five minutes. The solution is allowed to stir at room temperature for two hours.

The polymer is worked up by precipitating it in water. The polymer is then redissolved in methylene dichloride and reprecipitated in methanol twice. The resulting white powder is dried under vacuum at 70° C. for twenty-four hours.

Film Testing

An 8% polymer solution is prepared in chloroform. The solution is then filtered through a teflon filter to remove particulates. The film is cast on a glass plate. Approximately 10 grams of solution is poured onto the glass plate in a 110 cm glass ring. The solvent is allowed to evaporate off. The film is removed from the plate and dried in a vacuum oven at 100° C. for twenty four hours, then 250° C. for another 24 hours.

The dried film is placed into a Dow Permeability Cell. A vacuum is pulled on one side and a nitrogen head is on the other. After three days of equilibrating the nitrogen permeability measurement are taken. The system is then purged with oxygen and allowed to equilibrate again before taking the oxygen measurement.

EXAMPLE II

Polyarylate membranes in accordance with the present invention are synthesized which have the general structural formula:

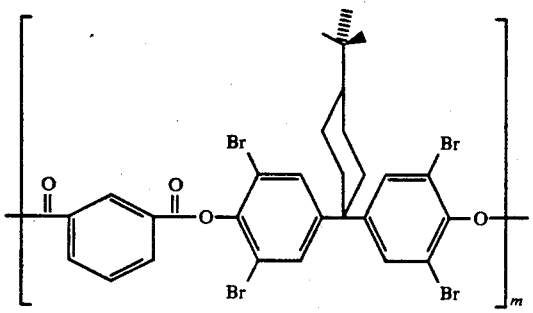

Polymerization

A one liter, three neck round bottom flask equipped with a mechanical stirrer, reflux condenser, and N₂ dip tube, is charged with 200 ml of water. The water is heated until it refluxes. Nitrogen is bubbled through the solution for one hour. Sodium hydroxide (4 grams, 0.1 mole) is added to the stirring solution. When it has dissolved, the solution is allowed to cool to room temperature. The 1,1-bis(2,6-dibromophenol)-4-t-butyl cyclohexane (31.97 grams, 0.05 moles) is then added. The monomer dissolves and the solution is allowed to stir for 30 mintues. Benzyltrimethylammonium chloride (0.3 grams) is added as a phase transfer agent. Isophthaloyl dichloride (10 grams, 0.05 moles) is dissolved in 200 ml of methylene dichloride, which is then added to the stirring solution. The solution becomes viscous. The material is allowed to stir for two hours.

The polymer is worked up by rinsing the solution with a dilute acid solution (1% HCL, 200 ml), rinsing it with water, and precipitating the polymer in methanol. The polymer is filtered and redissolved in methylene dichloride and reprecipitated in methanol. This procedure is done twice. The resulting white powder is dried under vacuum at 70° C. for 24 hours.

Film Testing

An 8% polymer solution in 1,2 dichloroethane is prepared and filtered through a teflon filter to remove particulates. Approximately 10 grams of solution is poured onto the glass plate in a 110 cm glass ring. The solvent is allowed to evaporate off. The film is removed from the plate and dried in a vacuum oven at 100° C. for twenty four hours, then 250° C. for another 48 hours.

The dried film is placed into a Dow Permeability Cell. A vacuum is pulled on one side and a nitrogen head is on the other. After three days of equilibrating the nitrogen permeability measurement is taken. The system is then purged with oxygen and allowed to equilibrate again before taking the oxygen measurement.

EXAMPLE III

Polyarylate membranes are made in accordance with the present invention having the structural formula:

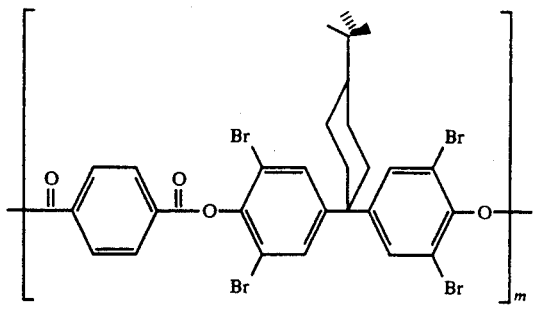

Polymerization

A one liter, three neck round bottom flask equipped with a mechanical stirrer, reflux condenser, and N₂ dip tube, is charged with 200 ml of water. The water is heated until it refluxes. Nitrogen is bubbled through the solution for one hour. Sodium hydroxide (4 grams, 0.1 mole) is added to the stirring solution. When it dissolves, the solution is allowed to cool to room temperature. The 1,1 bis(2,6-dibromophenol)-4-t-butyl cyclohexane (31.97 grams, 0.05 moles) is then added. The monomer dissolves and the solution is allowed to stir for 30 minutes. Benzyltrimethylammonium chloride (0.3 grams) is added as a phase transfer agent. Terephthaloyl dichloride (10 grams, 0.05 moles) is dissolved in 200 ml of methylene dichloride, which is then added to the stirring solution. The solution becomes viscous. The material is allowed to stir for two hours.

The polymer is worked up by rinsing the solution with a dilute acid solution (1% HCL, 200 ml), rinsing it with water, and precipitating the polymer in methanol. The polymer is filtered and redissolved in methylene dichloride and reprecipitated in methanol. This procedure is done twice. The resulting white powder is dried under vacuum at 70° C. for 24 hours.

Film Testing

An 8% polymer solution in 1,2 dichloroethane is prepared and filtered through a teflon filter to remove particulates. Approximately 10 grams of solution is poured onto the glass plate in a 110 cm glass ring. The solvent is allowed to evaporate off. The film is removed from the plate and dried in a vacuum oven at 100° C. for twenty four hours, then 250° C. for another 48 hours.

The dried film is placed into a Dow Permeability Cell. A vacuum is pulled on one side and a nitrogen head is on the other. After three days of equilibrating the nitrogen permeability measurement is taken. The system is then purged with oxygen and allowed to equilibrate again before taking the oxygen measurement.

Having thus described the present invention, what is now deemed appropriate for Letters Patent is set out in the following appended claims.

What is claimed is:

1. A semi-permeable membrane formed from a polyarylate containing polymerizable units of the formula:

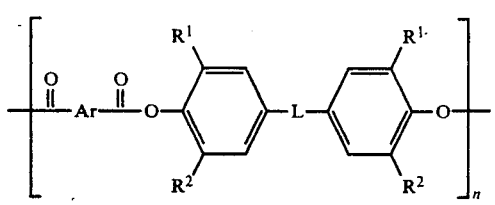

wherein Ar is a $C_1$–$C_{20}$ divalent hydrocarbon radical; $R^1$ and $R^2$ are independently halo or methyl substituents; n is an integer greater than 50; and L is a cyclohexyl moiety either substituted at the 4 position with a $C_4$–$C_{12}$ alkyl group or a $C_6$–$C_{20}$ aryl group, or diequitorally substituted at the 3, 5 positions with a $C_1$–$C_4$ alkyl group.

2. A membrane in accordance with claim 1 wherein L is

3. A membrane in accordance with claim 1 wherein Ar is selected from the group consisting of:

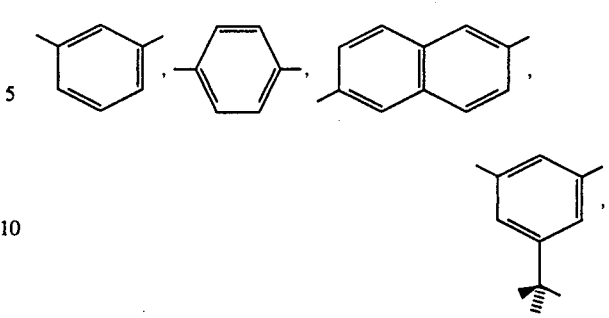

and mixtures of the above.

4. A membrane in accordance with claim 1 wherein $R^1$ and $R^2$ are Br.

5. A membrane in accordance with claim 1 wherein L is

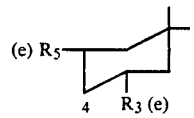

wherein each R is independently a $C_1$–$C_4$ alkyl group.

6. A process for separating a component of a gas mixture containing at least one other component, said process comprising: bringing said gas mixture into contact with the membrane of claim 1 which is selectively permeable toward one component of said gas mixture, whereby said component selectively permeates through said membrane from a feed side having a higher partial pressure of said component to a permeate side having a lower partial pressure of said component.

7. A process in accordance with claim 6 wherein the gas mixture is air and oxygen selectively permeates through the membrane.

8. A process in accordance with claim 6 wherein the gas mixture contains nitrogen and oxygen.

* * * * *